(12) United States Patent
Dowty et al.

(10) Patent No.: US 11,077,947 B2
(45) Date of Patent: Aug. 3, 2021

(54) SUITE BRIDGE WITH PRIVACY PANEL

(71) Applicant: B/E Aerospace, Inc., Winston-Salem, NC (US)

(72) Inventors: Mark B. Dowty, Rural Hall, NC (US); Ian L. Frost, Winston-Salem, NC (US); Martin R. Darbyshire, London (GB); Dennis M. Heuer, Kernersville, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/685,184

(22) Filed: Nov. 15, 2019

(65) Prior Publication Data

US 2021/0147083 A1    May 20, 2021

(51) Int. Cl.
*B64D 11/06* (2006.01)
*B64C 1/14* (2006.01)

(52) U.S. Cl.
CPC ........ *B64D 11/0606* (2014.12); *B64C 1/1438* (2013.01)

(58) Field of Classification Search
CPC ............ B64D 11/0606; B64D 11/0605; B64D 11/0604; B64D 11/0602; B64D 2011/0046; B64D 2011/0023; B64D 11/0023; B64D 11/0015; A47B 83/001; A47B 83/023; A47B 57/585; A47B 2220/0075
See application file for complete search history.

(56) References Cited

U.S. PATENT DOCUMENTS

| | | | | |
|---|---|---|---|---|
| 2,396,039 | A | * | 3/1946 | Graves .................. B64D 11/00 244/118.1 |
| 5,024,398 | A | * | 6/1991 | Riedinger .......... B64D 11/0015 244/118.5 |
| 9,027,880 | B2 | | 5/2015 | Breuer et al. |
| 9,920,559 | B2 | | 3/2018 | Druckman et al. |
| 10,131,432 | B2 | | 11/2018 | Simeon et al. |
| 10,829,218 | B2 | * | 11/2020 | Mariat ............... B64D 11/0601 |

(Continued)

FOREIGN PATENT DOCUMENTS

| | | |
|---|---|---|
| GB | 2555123 A | 4/2018 |
| WO | WO-2018178246 A1 * | 10/2018 ......... B64D 11/0641 |

OTHER PUBLICATIONS

Extended Search Report for European Application No. 20207905.9 dated Apr. 6, 2021, 9 pages.

*Primary Examiner* — Christopher D Hutchens
(74) *Attorney, Agent, or Firm* — Suiter Swantz pc llo

(57) ABSTRACT

A passenger suite seating unit is disclosed. In embodiments, the passenger suite seating unit includes a first set of one or more passenger suites and a second set of one or more passenger suites. The passenger suite seating unit may further include a first privacy shell element defining at least a portion of a first side of the passenger suite seating unit, and a second privacy shell element defining at least a portion of a second side of the passenger suite seating unit. The passenger suite seating unit may further include a privacy bridge assembly including a bridge structure extending from the first privacy shell element to the second privacy shell element, and a partition wall coupled to the bridge structure, the partition wall configured to at least partially separate the first set of one or more passenger suites and the second set of one or more passenger seats.

12 Claims, 11 Drawing Sheets

(56) References Cited

U.S. PATENT DOCUMENTS

| | | |
|---|---|---|
| 2005/0001097 A1 | 1/2005 | Saint-Jalmes |
| 2005/0011138 A1* | 1/2005 | Ball ..................... E04B 2/7425 |
| | | 52/36.1 |
| 2012/0012704 A1 | 1/2012 | Mosier et al. |
| 2014/0361585 A1* | 12/2014 | Henshaw ........... B64D 11/0606 |
| | | 297/174 R |
| 2015/0166183 A1* | 6/2015 | Henshaw ........... B64D 11/0641 |
| | | 244/118.6 |
| 2016/0115721 A1* | 4/2016 | Leadens, II ........ B64D 11/0023 |
| | | 244/129.5 |
| 2016/0297524 A1* | 10/2016 | Simeon ............. B64D 11/0606 |
| 2017/0106980 A1 | 4/2017 | Kuyper et al. |
| 2018/0281961 A1* | 10/2018 | Mariat ............... B64D 11/0606 |
| 2018/0281963 A1* | 10/2018 | Dowty ............... B64D 11/0606 |
| 2018/0281964 A1* | 10/2018 | Carlioz .............. B64D 11/0604 |
| 2018/0297707 A1* | 10/2018 | Gharia ............... B64D 11/0023 |
| 2018/0368572 A1* | 12/2018 | Amit ................... F21V 23/0442 |
| 2019/0248498 A1 | 8/2019 | Kimizuka et al. |
| 2019/0315468 A1 | 10/2019 | White et al. |
| 2019/0357676 A1* | 11/2019 | Matthai .................... A47B 9/20 |
| 2020/0130840 A1* | 4/2020 | Frost ...................... E05D 15/10 |
| 2020/0148363 A1* | 5/2020 | White ................ B64D 11/0606 |
| 2020/0216177 A1* | 7/2020 | White ................ B64D 11/0605 |

* cited by examiner

A-A

SUITE BRIDGE WITH PRIVACY PANEL

BACKGROUND

Aircraft cabins may include a wide variety of seating arrangements in addition to rows of passenger seats. For example, passenger suite seating units may include sets of two or more passenger suites arranged at an angle and/or facing one another. Such configurations may enable increased interaction and collaboration between passengers. In these passenger suite seating units, there is a need to balance competing demands for openness and privacy. Privacy shell elements and doors may provide privacy for passengers within a passenger suite seating unit, whereas actuatable walls or panels may provide for openness and/or privacy within the passenger suite seating unit itself. However, in order to provide sufficient privacy options while simultaneously preserving the potential for openness within the passenger suite seating unit, privacy shell elements and actuatable walls of traditional passenger suite seating units are excessively heavy, thereby increasing the overall weight of the aircraft. Therefore, there exists a need in the art which address one or more of the shortfalls of previous approaches identified above.

SUMMARY

A passenger suite seating unit is disclosed. In embodiments, the passenger suite seating unit includes a first set of one or more passenger suites and a second set of one or more passenger suites. The passenger suite seating unit may further include a first privacy shell element defining at least a portion of a first side of the passenger suite seating unit, and a second privacy shell element defining at least a portion of a second side of the passenger suite seating unit. In embodiments, the passenger suite seating unit may further include a privacy bridge assembly including a bridge structure extending from the first privacy shell element to the second privacy shell element, and a partition wall coupled to the bridge structure, the partition wall configured to at least partially separate the first set of one or more passenger suites and the second set of one or more passenger seats.

In some embodiments of the passenger suite seating unit, the bridge structure is configured to structurally support the first privacy shell element and the second privacy shell element.

In some embodiments of the passenger suite seating unit, the bridge structure extends from an upper surface of the first privacy shell element to an upper surface of the second privacy shell element.

In some embodiments of the passenger suite seating unit, the partition wall includes one or more privacy structures coupled to a lower surface of the bridge structure.

In some embodiments of the passenger suite seating unit, the one or more privacy structures include one or more privacy panels configured to be actuated along a track disposed within the bridge structure.

In some embodiments of the passenger suite seating unit, the one or more privacy structures include one or more curtains configured to be selectively actuated between a deployed position and a stowed position.

In some embodiments of the passenger suite seating unit, the one or more curtains are configured to be selectively actuated along a movement axis comprising at least one of a vertical movement axis substantially orthogonal to the bridge structure or a horizontal movement axis substantially parallel to the bridge structure.

In some embodiments of the passenger suite seating unit, the passenger suite seating unit is disposed within a cabin of an aircraft.

In some embodiments of the passenger suite seating unit, the passenger suite seating unit further includes a first set of one or more openings disposed within the first privacy shell element, and a second set of one or more openings disposed within the second privacy shell element, wherein the first set of one or more openings and the second set of one or more openings are configured to provide ingress and egress to the first set of one or more passenger suites and the second set of one or more passenger suites.

In some embodiments of the passenger suite seating unit, the first privacy shell element includes one or more actuatable doors configured to be selectively actuated to a closed position in order to at least partially close the first set of one or more openings, and the second privacy shell element includes one or more actuatable doors configured to be selectively actuated to a closed position in order to at least partially close the second set of one or more openings.

In some embodiments of the passenger suite seating unit, the first set of one or more actuatable doors are slidingly coupled to the first privacy shell element and configured to be slidingly actuated between an open position and the closed position, and the second set of one or more actuatable doors are slidingly coupled to the second privacy shell element and configured to be slidingly actuated between an open position and the closed position.

In some embodiments of the passenger suite seating unit, the first set of one or more passenger suites include a first passenger suite and a second passenger suite, and the second set of one or more passenger suites include a third passenger suite and a fourth passenger suite.

In some embodiments of the passenger suite seating unit, the first passenger suite includes a first forward-facing passenger seat, the second passenger suite includes a second forward-facing passenger seat, the third passenger suite includes a third rearward facing passenger seat, and the fourth passenger suite includes a fourth rearward facing passenger seat.

In some embodiments of the passenger suite seating unit, the passenger suite seating unit further includes one or more suite dividers arranged substantially orthogonal with respect to the partition wall, wherein the one or more suite dividers are configured to at least partially separate the first passenger suite and the second passenger suite of the first set of one or more passenger suites, and at least partially separate the third passenger suite and the fourth passenger suite of the second set of one or more passenger suites.

A passenger suite seating unit is disclosed. In embodiments, the passenger suite seating unit includes a first privacy shell element defining at least a portion of a first side of the passenger suite seating unit, and a second privacy shell element defining at least a portion of a second side of the passenger suite seating unit. In some embodiments, the passenger suite seating unit further includes a bridge structure extending from a top surface of the first privacy shell element to a top surface of the second privacy shell element, the bridge structure configured to structurally support the first privacy shell element and the second privacy shell element. In embodiments, the passenger suite seating unit further includes a partition wall including one or more privacy structures coupled to a lower surface of the bridge structure, the partition wall configured to at least partially separate a first set of one or more passenger suites and a second set of one or more passenger seats of the passenger suite seating unit.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
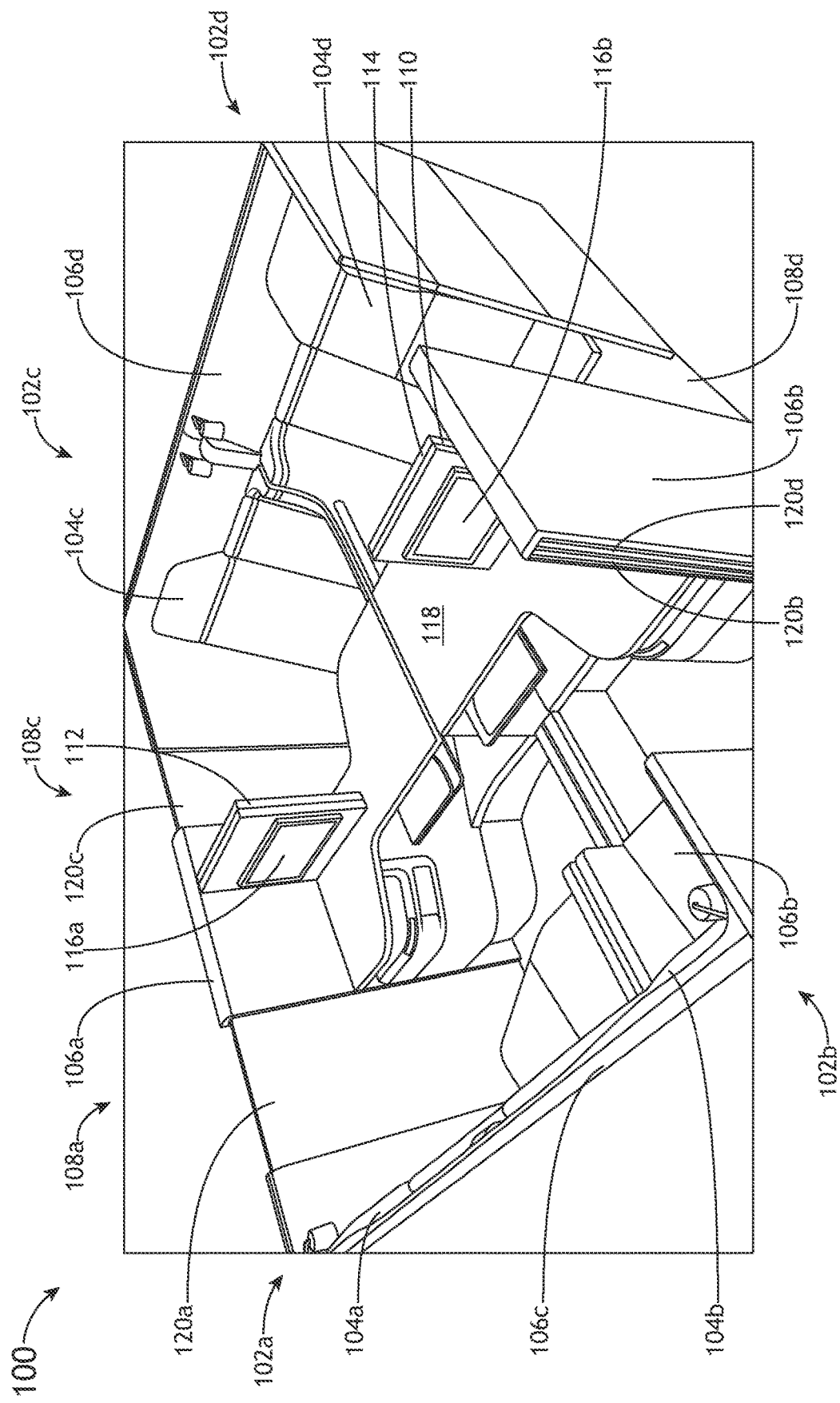
FIG. 1 illustrates a perspective view of a passenger suite seating unit.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1 b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Aircraft cabins may include a wide variety of seating arrangements in addition to rows of passenger seats. For example, passenger suite seating units may include sets of two or more passenger suites arranged at an angle and/or facing one another. Such configurations may enable increased interaction and collaboration between passengers. In these passenger suite seating units, there is a need to balance competing demands for openness and privacy. Privacy shell elements and doors may provide privacy for passengers within a passenger suite seating unit, whereas actuatable walls or panels may provide for openness and/or privacy within the passenger suite seating unit itself. However, in order to provide sufficient privacy options while simultaneously preserving the potential for openness within the passenger suite seating unit, privacy shell elements and actuatable walls of traditional passenger suite seating units are excessively heavy, thereby increasing the overall weight of the aircraft.

Accordingly, embodiments of the present disclosure are directed to a passenger suite seating unit which address one or more of the shortfalls of previous approaches identified above. Embodiments of the present disclosure are directed to a passenger suite seating unit including privacy shell elements and a privacy partition assembly coupling two or more of the privacy shell elements. The privacy partition assembly may include a bridge structure configured to structurally support the privacy shell elements of the passenger suite seating unit. Additional embodiments of the present disclosure are directed to a privacy partition assembly including a bridge structure and a partition wall coupled to the bridge structure, wherein the partition wall is configured to at least partially separate passenger suites within the passenger suite seating unit.

It is contemplated herein that the privacy partition assembly and bridge structure of the present disclosure may provide improved structural stability within a passenger suite seating unit. By improving structural stability, the bridge structure of the present disclosure may provide lighter weight solutions for passenger suite seating units, thereby decreasing the overall weight of the respective aircraft, vehicle, or other structure within which the passenger suite seating unit is disposed.

Reference will now be made in detail to the subject matter disclosed, which is illustrated in the accompanying drawings.

FIG. 1 illustrates a perspective view of a passenger suite seating unit 100. In particular, the passenger suite seating unit 100 depicted in FIG. 1 is shown as an example of a conventional passenger suite seating unit. It is contemplated herein that a brief description of the passenger suite seating unit 100 may provide a reference point against which attendant advantages of the present disclosure may be compared.

The passenger suite seating unit 100 may include a passenger suite disposed within an aircraft. The passenger suite seating unit 100 may include a plurality of passenger suites 102a, 102b, 102c, 102d, wherein each passenger suite 102a, 102b, 102c, 102d includes a passenger seat 104a, 104b, 104c, 104d. The perimeter of the passenger suite seating unit 100 may be defined by a plurality of privacy shell elements 106a, 106b, 106c, 106d. As shown in FIG. 1, the passenger suite seating unit 100 may include openings 108a, 108c in the privacy shell element 106a, and openings 108b, 108d in the privacy shell element 106b. The openings may be configured to provide for ingress and egress for the passenger suites 102a, 102b, 102c, 102d.

In order to provide increased privacy, the passenger suite seating unit 100 may include a partition wall 110 with one or more actuatable privacy panels 112, 114. For example, as shown in FIG. 1, the passenger suite seating unit 100 may include a centrally located table 118, wherein the first privacy panel 112 and the second privacy panel 114 are slidingly coupled to the table 118 such that the first and second privacy panels 112, 114 may be slid in order to open and/or close an opening within the partition wall 110. The first privacy panel 112 and the second privacy panel 114 may each include display devices 116a, 116b such that each passenger suite 102a, 102b, 102c, 102d includes a display device 116a, 116b.

The passenger suite seating unit 100 may further include a plurality of actuatable doors 120a, 120b, 120c, 120d. The plurality of doors 120a, 120b, 120c, 120d may be configured to be actuated between a stowed/open position and an extended/closed position in order to open and/or close off the openings 108a, 108b, 108c, 108d to the passenger suite seating unit 100. For example, as shown in FIG. 1, the privacy shell element 106a may include doors 120a, 120c disposed within the privacy shell element 106a while in a stowed position, wherein the door 120a may be actuated out from the privacy shell element 106a to an extended position in order to close the opening 108a. Similarly, the door 120c may be actuated out from the privacy shell element 106a to an extended position in order to close the opening 108c. By way of another example, the privacy shell element 106b may include doors 120b, 120d disposed within the privacy shell element 106b while in a stowed position, wherein the doors 120b, 120d may be actuated out from the privacy shell element 106b to an extended position to close the openings 108b, 108d, respectively.

Storing the doors 120a-120d within the privacy shell elements 106a, 106b may provide for improved space management within an aircraft. However, mounting the doors 120a-120d to the privacy shell elements 106a, 106b in such a manner places large amounts of stress on the privacy shell elements 106a, 106b. In particular, the privacy shell elements 106a, 106b must be sufficiently heavy and structurally supported in order to support the weight of the doors 120a-120d. Additionally, the loads placed on the privacy shell elements 106a, 106b are amplified when the doors 120a-120d are actuated to an extended position. Furthermore, the privacy shell elements 106a, 106b must at least partially support the partition wall 110 and privacy panels 112, 114 as the privacy panels 112, 114 are actuated along the desk 118.

Taken together, the privacy shell elements 106a, 106b are required to be significantly reinforced in order to safely and effectively maintain the structural loads exerted by the doors 120a-120d and the privacy panels 112, 114 of the partition wall 110. This adds to the cumulative weight of the passenger suite seating unit 100. In the context of aviation, increased weight of the passenger suite seating unit 100 results in an increased overall weight of the aircraft, thereby increasing the operating costs of the aircraft.

Accordingly, embodiments of the present disclosure are directed to a passenger suite seating unit which address one or more of the shortfalls of the passenger suite seating unit 100 identified above. In particular, embodiments of the present disclosure are directed to a passenger suite seating unit including a privacy partition assembly and a bridge structure configured to structurally support the privacy shell elements of the passenger suite seating unit.

Figure 2A:
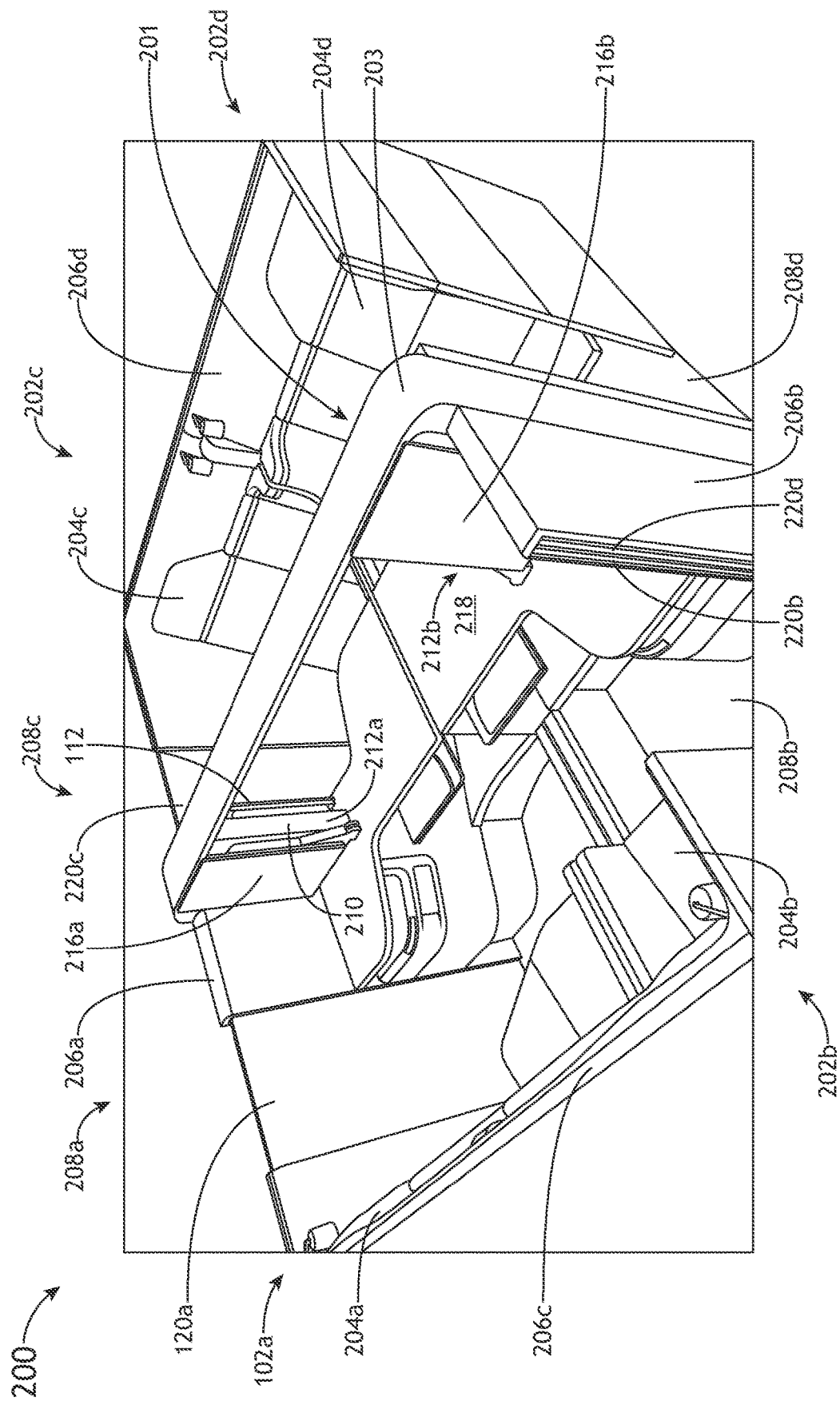
FIG. 2A illustrates a perspective view of a passenger suite seating unit including a bridge structure, in accordance with one or more embodiments of the present disclosure.

FIG. 2A illustrates a perspective view of a passenger suite seating unit 200 including a bridge structure 203, in accordance with one or more embodiments of the present disclosure.

In embodiments, the passenger suite seating unit 200 may include a plurality of passenger suites. For example, the passenger suite seating unit 200 may include a first set of one or more passenger suites and a second set of one or more passenger suites, wherein the first set of passenger suites includes a first passenger suite 202a and a second passenger suite 202b, and the second set of one or more passenger suites includes a third passenger suite 202c and a fourth passenger suite 202d. In embodiments, the passenger suite 202a and the second passenger suite 202b may be positioned adjacent to one another, and the third passenger suite 202c and the fourth passenger suite 202d may be positioned adjacent to one another, wherein the first and second passenger suites 202a, 202b face the third and fourth passenger suites 202c, 202d. In embodiments where the passenger suite seating unit 200 is disposed on an aircraft, the first and second passenger suites 202a, 202b may include forward-facing passenger suites, wherein the third and fourth passenger suites 202c, 202d may include rearward-facing passenger suites.

In embodiments, each passenger suite 202a, 202b, 202c, 202d may include a passenger seat 204a, 204b, 204c, 204d. For example, the first passenger suite 202a may include a forward-facing passenger seat 204a, the second passenger suite 202b may include a forward-facing passenger seat 204b, the third passenger suite 202c may include a rearward-facing passenger seat 204c, and the fourth passenger suite 202d may include a rearward-facing passenger seat 204d. Each of the passenger seats 204a-204d may be configured to be selectively adjusted between an upright sitting position and a lie-flat sleeping position.

In some embodiments, a perimeter of the passenger seat seating unit 100 may be at least partially defined by one or more privacy shell elements 206a, 206b, 206c, 206d. The one or more privacy shell elements 206a-206d may include vertical walls which extend from a ground surface (e.g., aircraft floor) to a height at least above a seating surface of each passenger seat 204a-204d. In this regard, the one or more privacy shell elements 206a-206d may serve to at least partially separate the interior of the passenger seat seating unit 100 from an exterior of the passenger seat seating unit 200 (e.g., remainder of an aircraft cabin). For example, a first privacy shell element 206a may define at least a portion of a first side of the passenger seat seating unit 200, and a second privacy shell element 206b may define at least a portion of a second side of the passenger seat seating unit 200. For instance, the first privacy shell element 206a may define at least a portion of a first lateral side of the passenger seat seating unit 200, and a second privacy shell element 206b may define at least a portion of a second lateral side of the passenger seat seating unit 100 opposite the first lateral side. By way of another example, the privacy shell elements 206c, 206d may define at least a portion of a forward and rearward sides of the passenger seat seating unit 200, and may be coupled to the first and second privacy shell elements 206a, 206b.

While the passenger suite seating unit 200 is shown and described in a substantially square or rectangular shape with four separate privacy shell elements 206a-206d, this is not to be regarded as a limitation of the present disclosure, unless noted herein. In this regard, the passenger suite seating unit 200 may include one or more privacy shell elements 206a-206n arranged in any configuration known in the art including, but not limited to, a circle, an oval, a complex shape, and the like.

The passenger suite seating unit 200 may include one or more openings configured to provide ingress and egress to the passenger suites 202a-202n. For example, as shown in FIG. 2A, the first privacy shell element 206a may include a first set of one or more openings, and the second privacy shell element 206b may include a second set of one or more openings. For instance, the first privacy shell element 206a may include an opening 208a and an opening 208b configured to provide ingress and egress to the first and third passenger suites 202a, 202c, and the second privacy shell element 206b may include an opening 208b and an opening 208d configured to provide ingress and egress to the second and fourth passenger suites 202b, 202d.

In embodiments, the passenger suite seating unit 200 may further include a plurality of actuatable doors configured to open and close the openings 208a-208d. For example, the first privacy shell element 206a may include one or more actuatable doors 220a, 220c configured to be selectively actuated from a stowed/open position to an extended/closed in order to at least partially close the first set of one or more openings 208a, 208c. By way of another example, the second privacy shell element 206b may include one or more actuatable doors 220b, 220d configured to be selectively actuated from a stowed/open position to an extended/closed in order to at least partially close the second set of one or more openings 208b, 208d.

The plurality of actuatable doors 220a-220d may be slidingly coupled to the first privacy shell element 206a and the second privacy shell element 206b such that they may be selectively and slidingly actuated between a stowed position (e.g., open position) and an extended position (e.g., closed position). In some embodiments, the plurality of actuatable doors 220a-220d may be disposed within a cavity of the privacy shell elements 206a, 206b. For example, as shown in FIG. 2A, the plurality of actuatable doors 220a-220d may include "pocket doors" which are disposed within the first privacy shell element 206a and the second privacy shell element 206b while in the stowed/open position.

As noted previously herein with respect to the passenger suite seating unit 100 illustrated in FIGS. 1A-1B, mounting/coupling the doors 220a-220d on/within the privacy shell elements 206a, 206b may place large structural loads on the privacy shell elements 206a, 206b. In particular, doors 220a-220d actuated into an extended/open position may increase the structural loads placed on the privacy shell elements 206a, 206b. In order to withstand these large structural forces, the privacy shell elements 106a, 106b of the passenger suite seating unit 100 were required to be very sturdy and structurally reinforced, thereby leading to heavy privacy shell elements 106a, 106b and an increase in the overall weight of the passenger suite seating unit 100.

It is contemplated herein that the passenger suite seating unit 200 of the present disclosure may be implemented in an inboard and/or outboard configuration of an aircraft. For example, in an inboard configuration, the passenger suite seating unit 200 may be positioned centrally (or approximately centrally) within a cabin of an aircraft. In order to address the structural loads exerted on the privacy shell elements 206a, 206b in the inboard configuration, embodiments of the present disclosure are directed to a privacy bridge assembly 201 extending between the privacy shell elements 206a, 206b. The privacy bridge assembly 201 may include a bridge structure 203 and a partition wall 210.

In embodiments, the bridge structure 203 may extend from one side of the passenger suite seating unit 200 to a second side of the passenger suite seating unit 200 in order to structurally support the plurality of privacy shell elements 206a-206d. For example, as shown in FIG. 2A, the bridge structure 203 may be coupled to the first privacy shell element 206a and the second privacy shell element 206b such that the bridge structure traverses the width of the passenger suite seating unit 200 from the first privacy shell element 206a to the second privacy shell element 206b.

By way of another example, in an outboard configuration, the passenger suite seating unit 200 may be positioned adjacent to a sidewall of a cabin of an aircraft. In an outboard configuration, the privacy bridge assembly 201 may extend from a privacy shell element 206a within the cabin to a sidewall of the cabin of the aircraft. In this regard, the sidewall of the cabin of the aircraft may serve as a privacy shell element 206b opposite the privacy shell element 206a in the outboard configuration.

In some embodiments, the bridge structure 203 may be configured to extend from an upper surface of the first privacy shell element 206a and an upper surface of the second privacy shell element 206b. It is contemplated herein that the bridge structure 203 may be configured to couple the privacy shell elements 206a, 206b in order structurally support the privacy shell elements 206a, 206b and to provide additional rigidity in order offset the structural loads exerted by the doors 220a-220d on the privacy shell elements 206a, 206b.

In some embodiments, the privacy bridge assembly 201 may further include one or more vertical support structures. For example, the privacy bridge assembly 201 may include a vertical support structure extending from the desk 218 to a lower surface of the bridge structure 203 in order to at least partially support the weight of the bridge structure 203. For instance, referring to FIG. 2B, the privacy bridge assembly 201 may include a vertical support structure extending from the desk 218 along a centerline dividing the first and third passenger suites 202a, 202c and the second and fourth passenger suites 202b, 202d. In additional and/or alternative embodiments, the privacy bridge assembly 201 may include a "partial" privacy bridge assembly configured to extend only partially across the passenger suite seating unit 200. For example, in embodiments one or more vertical support structures extending from the desk 218 of the passenger suite seating unit 200, the bridge structure 203 may extend from a privacy shell element 206a, 206b to the vertical support structure. For instance, in embodiments with a vertical support structure extending from the desk 218 along a centerline of the passenger suite seating unit 200, the bridge structure 203 may extend from the privacy shell element 206a to the vertical support structure, such that the bridge structure 203 only traverses approximately half of the passenger suite seating unit 200.

It is noted herein that the bridge structure 203 illustrated in FIG. 2A results in increased weight added to the passenger suite seating unit 200 when compared to the passenger suite seating unit 100 illustrated in FIGS. 1A-1B. However, it has been found that the structural support provided by the bridge structure 203 enables a significant decrease in weight of the privacy shell elements 206a, 206b as compared to the privacy shell elements 106a, 106b without compromising structural integrity or safe/efficient operation of the doors 220a-220d. Moreover, it has been found that the added weight due to the addition of the bridge structure 203 is dwarfed by the weight savings in the privacy shell elements 206a, 206b, thereby leading to an overall net decrease in the weight of the passenger suite seating unit 200.

The bridge structure 203 of the privacy bridge assembly 201 may provide a number of additional benefits as compared to the passenger suite seating unit 100 illustrated in FIGS. 2A-1B. For example, the bridge structure 203 may provide an additional mounting structure and mounting surfaces to which the partition wall 210 of the privacy bridge assembly 201 may be coupled. In this regard, the partition wall 210 may be coupled to an upper surface of a table 218 and a lower surface of the bridge structure 203 in order to provide additional structural support and rigidity to the partition wall 210.

The bridge structure 203 may further provide additional surfaces within which to mount additional amenities and features for aircraft passengers. For example, the lower surface of the bridge structure 203 may include one or more lights configured to illuminate the desk 218 and/or other portions of the passenger suite seating unit 200. By way of another example, the bridge structure 203 may include air ducts and air venting gaspers to provide additional air flow and comfort for passengers within the passenger suite seating unit 200.

Figure 2B:
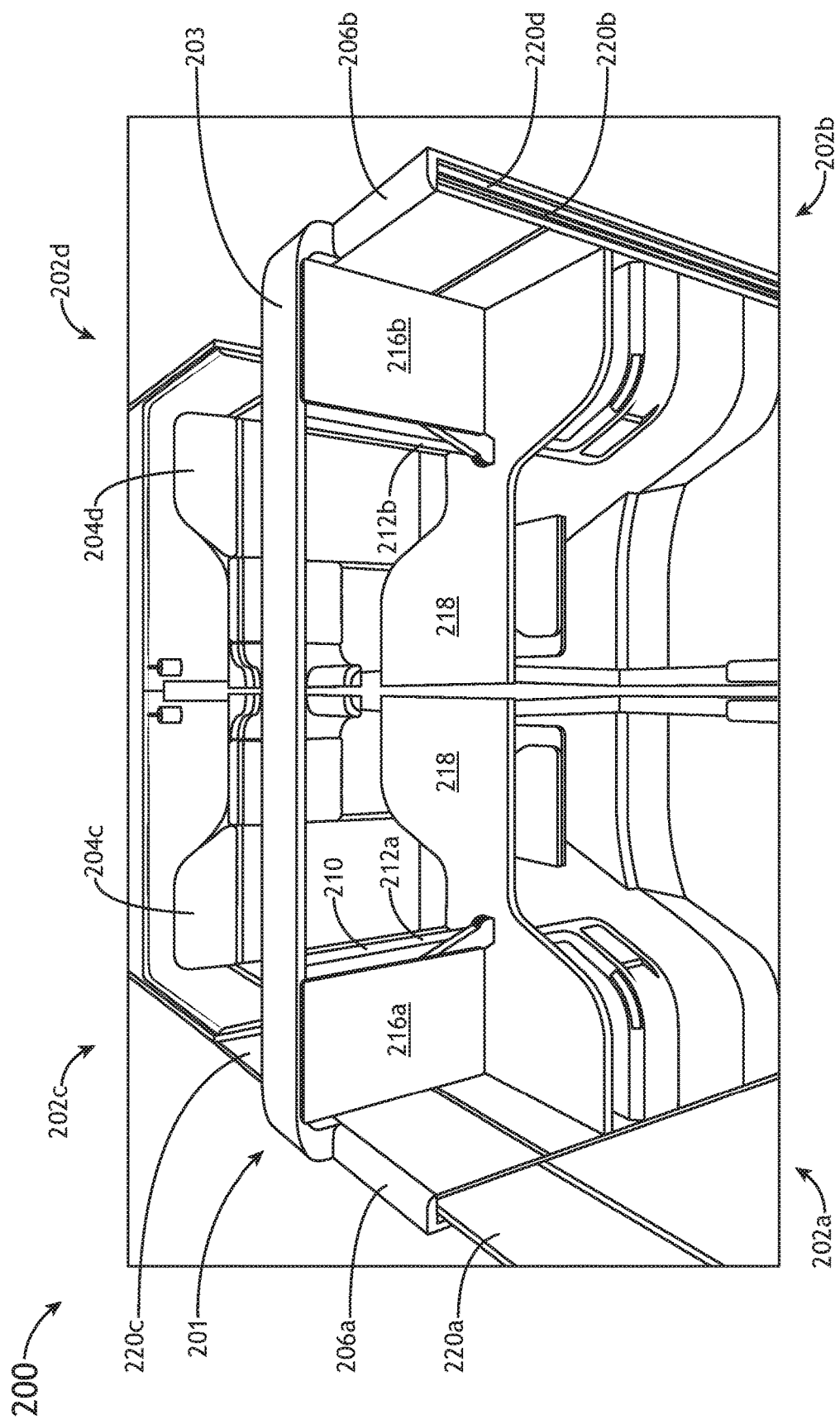
FIG. 2B illustrates a perspective view of a passenger suite seating unit including a bridge structure, in accordance with one or more embodiments of the present disclosure.
Figure 2C:
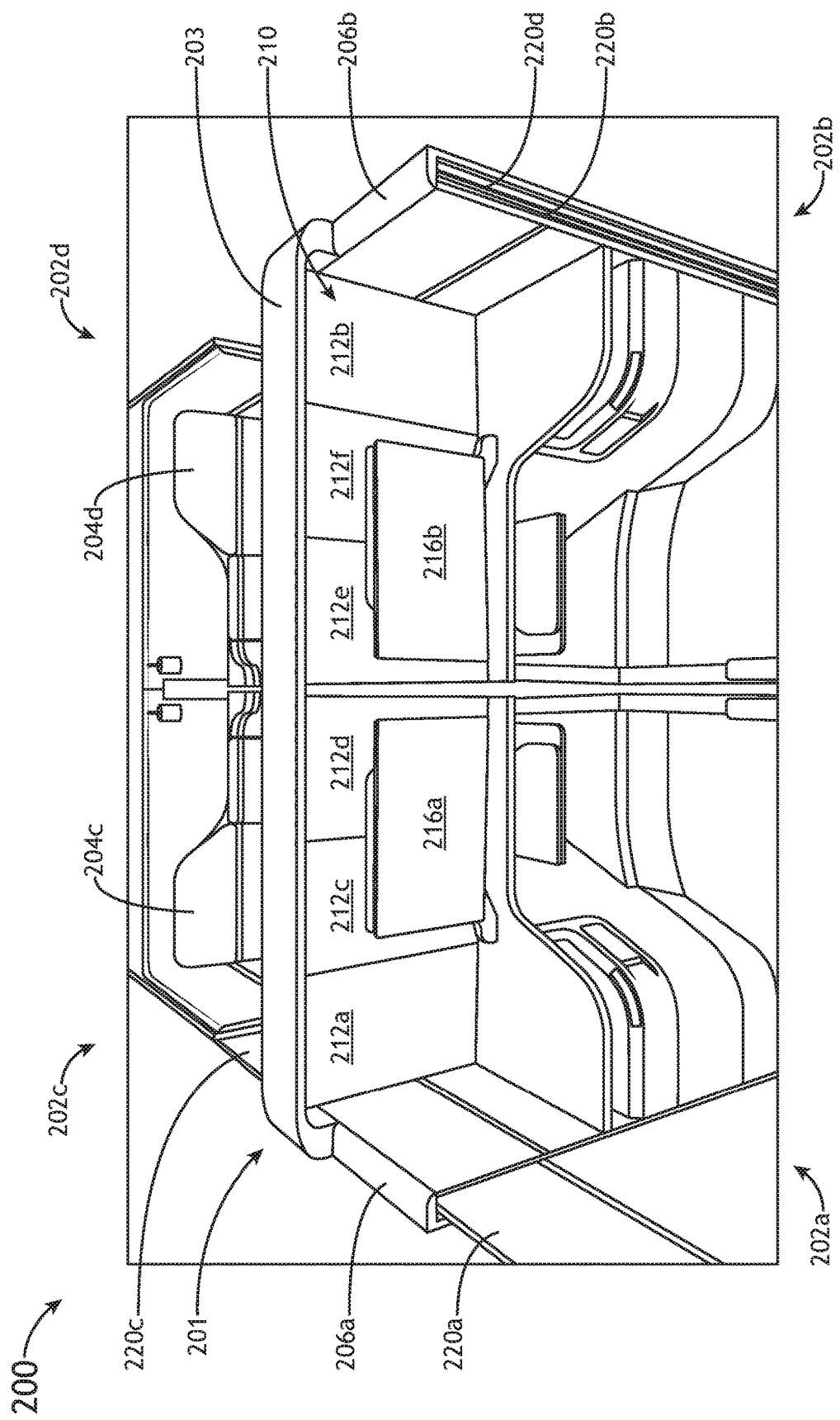
FIG. 2C illustrates a perspective view of a passenger suite seating unit including a bridge structure, in accordance with one or more embodiments of the present disclosure.

In embodiments, the partition wall 210 coupled to the bridge structure 203 may be configured to at least partially separate the first set of one or more passenger suites 202a, 202b and the second set of one or more passenger suites 202c, 202d. In some embodiments, the partition wall 210 may include one or more privacy structures. For example, as shown in FIGS. 2B-2C, the partition wall 210 may include one or more privacy panels 212. The one or more privacy structures (e.g., privacy panels 212) may be further understood with reference to FIGS. 2B-2C.

FIG. 2B illustrates a perspective view of a passenger suite seating unit 200 including a bridge structure 203, in accordance with one or more embodiments of the present disclosure. FIG. 2C illustrates a perspective view of a passenger suite seating unit 200 including a bridge structure 203, in accordance with one or more embodiments of the present disclosure.

As noted previously herein, the privacy bridge assembly 201 of the present disclosure may include one or more privacy structures configured to at least partially separate the first set of one or more passenger suites 202a, 202b and the second set of one or more passenger suites 202c, 202d. In embodiments, the one or more privacy structures may be coupled to the desk 218, the first privacy shell element 206a, the second privacy shell element 206b, and/or the bridge structure 203. For example, as shown in FIGS. 2A-2B, the one or more privacy structures may include one or more privacy panels 212. The one or more privacy panels 212 may be coupled to a lower surface of the bridge structure 203. In embodiments, privacy bridge assembly 201 may include one or more display devices 216a-216b coupled to the one or more privacy structures.

In some embodiments, the one or more privacy structures (e.g., privacy panels 212) may be configured to be actuated along a track disposed within the bridge structure 203. For example, as shown in FIGS. 2B-2C, the one or more privacy panels 212a-212e may be coupled to a lower surface of the bridge structure 203 via a track disposed within the lower surface of the bridge structure 203. In this example, the one or more privacy panels 212 may be slidingly coupled to the lower surface of the bridge structure 203 such that the one or more privacy panels 212 may be selectively actuated along the track to provide varying degrees of privacy and/or openness. The one or more privacy panels 212a-212e may include rigid privacy panels, semi-rigid panels, and the like. By way of another example, the one or more privacy panels 212a-212e may be coupled to one another such that the privacy panels 212a-212e form a folding accordion-type partition wall 210.

In embodiments, the one or more display devices 216a-216d may be disposed on and/or within the one or more privacy panels 212. For example, in some embodiments, the one or more display devices 216a-216d may be disposed within the one or more privacy panels 212 such that a front surface of the display devices 216a-216d is flush, or substantially flush, with a front surface of the privacy panels 212. It is noted herein that disposing the display devices 216a-216d within the one or more privacy panels 212 such that a front surface of the display devices 216a-216d is flush, or substantially flush, with a front surface of the privacy panels 212 may prevent passengers from inadvertently grabbing or pulling the display devices 216a-216d, thereby reducing the structural components and weight required to mount the display devices 216a-216d. In some embodiments, the one or more display devices 216a-216d may be configured to be selectively actuated, pivoted, and/or rotated in conjunction with the selective actuation of the one or more privacy panels 212. The display devices 216a-216d coupled to the privacy structures of the privacy bridge assembly 201 are described in further detail in U.S. Patent Application No. 2016/0297524A1, filed on Apr. 7, 2016, entitled PRIVACY DIVIDER WITH VIDEO MONITOR FUNCTION FOR VEHICLE PASSENGER SEATING UNIT, which is incorporated herein by reference in the entirety.

It is noted herein that the bridge structure 203 of the privacy bridge assembly 201 may serve to stabilize the one or more privacy structures (e.g., privacy panels 212) as they are selectively actuated across the passenger suite seating unit 200. For example, as shown in FIGS. 1A-1B, the partition wall 110 of the passenger suite seating unit 100 may be coupled only to the desk 118, and may be unsupported along a top surface of the partition wall 110. Conversely, the privacy structures of the partition wall 210 of the passenger suite seating unit 200 may be structurally supported along both a bottom surface of the partition wall 210 (e.g., via desk 218) and along a top surface of the partition wall 210 (e.g., via bridge structure 203). In this regard, the bridge structure 203 may provide for more efficient actuation of the privacy structures (e.g., privacy panels 212). Additionally, by mounting the privacy structures (e.g., privacy panels 212) to the lower surface of the bridge structure 203, the bridge structure 203 may bear at least a portion of a structural load exerted by the privacy panels 212 and display monitors 216, thereby reducing the structural loads exerted on the privacy shell elements 206a, 206b and further reducing the weight required for the privacy shell elements 206a, 206b.

Figure 3:
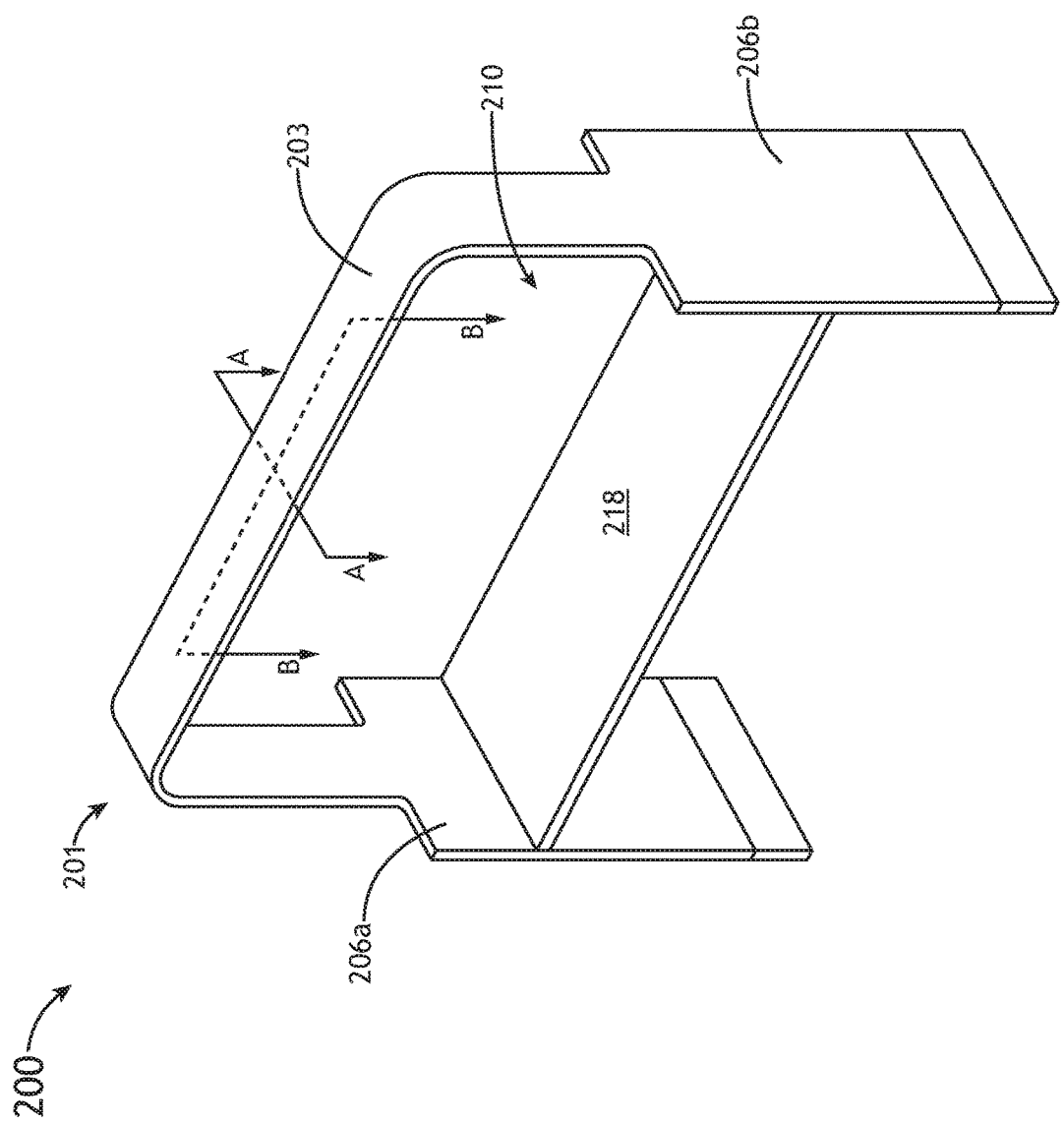
FIG. 3 illustrates a perspective view of a privacy partition assembly including a bridge structure, in accordance with one or more embodiments of the present disclosure.

FIG. 3 illustrates a perspective view of a privacy partition assembly 201 including a bridge structure 203, in accordance with one or more embodiments of the present disclosure.

In embodiments, as shown previously herein, the bridge structure 203 of the privacy partition assembly 201 may be coupled to a first privacy shell element 206a and a second privacy shell element 206b. A desk 218 may further be coupled to the first privacy shell element 206a and the second privacy shell element 206b such that an upper surface of the desk faces a lower surface of the bridge structure 203. The partition wall 210 including one or more privacy structures (e.g., privacy panels 212) may be configured to fill at least a portion of an area defined by the first privacy shell element 206a, the second privacy shell element 206b, the desk, and the bridge structure 203.

In some embodiments, the bridge structure 203 may be fabricated separately from the privacy shell elements 206a, 206b. In this regard, the bridge structure 203 may be affixed to the privacy shell elements 206a, 206b in order to structurally support the privacy shell elements 206a, 206b. In additional and/or alternative embodiments, the bridge structure 203 may be fabricated as a single, unitary assembly with the first privacy shell element 206a and/or the second privacy shell element 206b. For example, as shown in FIG. 3, the first privacy shell element 206a, the bridge structure 203, and the second privacy shell element 206b may include a single unitary structure.

While the partition wall 210 including one or more privacy structures was previously shown and described as including one or more privacy panels 212, this is not to be regarded as a limitation of the present disclosure, unless noted otherwise herein. In this regard, the partition wall 210 and/or privacy structures of the partition wall 210 may include any structures known in the art configured to physically and/or visibly separate spaces. For example, the one or more privacy structures may include, but are not limited to, privacy panels 212, curtains, blinds, shades, and the like. This may be further understood with reference to FIG. 4

Figure 4:
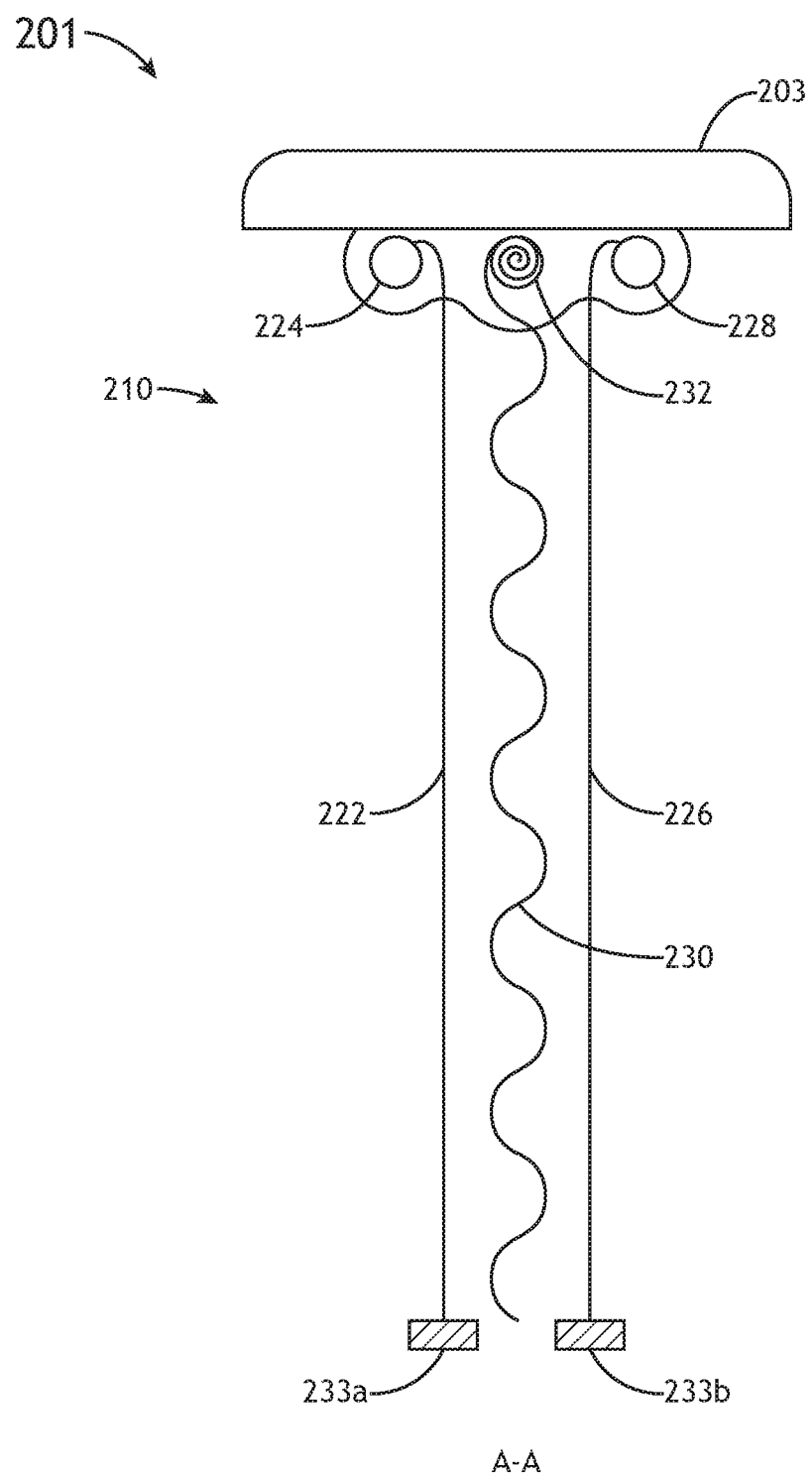
FIG. 4 illustrates a cross-sectional view of a privacy partition assembly including a bridge structure, in accordance with one or more embodiments of the present disclosure. disclosure.

FIG. 4 illustrates a cross-sectional view of a privacy partition assembly 201 including a bridge structure 203, in accordance with one or more embodiments of the present disclosure. In particular, FIG. 4 illustrates a cross-sectional view of the privacy partition assembly 201 illustrated in FIG. 3 viewed along axis A-A.

In some embodiments, the partition wall 210 of the privacy partition assembly 201 may include one or more privacy structures, wherein the one or more privacy structures include one or more curtains. For example, as shown in FIG. 4, the privacy partition assembly 201 may include curtains 222, 226, and 230. For instance, the curtain 222 facing the first set of one or more passenger suites 202a, 202b may include a first decorative/aesthetic curtain, the curtain 226 facing the second set of one or more passenger suites 202c, 202d may include a second decorative/aesthetic curtain, and the curtain 230 may include a sound dampening and/or darkening curtain.

In embodiments, each of the curtains 222, 226, 230 may be coupled to the bridge structure 201. In each of the curtains 222, 226, 230 may be coupled to the bridge structure 201 via an actuation/roller assembly. For example, as shown in FIG. 4, the curtain 222 may be coupled to the bridge structure 203 via a roller assembly 224 coupled to the bridge structure 203. Similarly, the curtains 226, 230 may be coupled to the bridge structure 203 via roller assemblies 228, 232, respectively. The actuation/roller assemblies 224, 228, 232 may be configured to selectively actuate the curtains 222, 226, 230 along a vertical movement axis between a deployed position and a stowed position. For example, the curtains 222, 226, 230 may be positioned in a deployed position wherein the curtains 222, 226, 230 are extended from the bridge structure 203 toward the desk 218. In this example, the actuation/roller assemblies 224, 228, 232 may be configured to selectively actuate the curtains 222, 226, 230 along a vertical movement axis (e.g., movement axis substantially perpendicular to the bridge structure 203 and/or desk 218) from the deployed position to a stowed position in which the curtains 222, 226, 230 are wrapped on and/or within the actuation/roller assemblies 224, 228, 232.

It is noted herein that the actuation/roller assemblies 224, 228, 232 may be selectively actuated independently from one another, or in tandem. Additionally, the actuation/roller assemblies 224, 228, 232 may be selectively actuated via any technique known in the art. For example, aircraft personnel and/or passengers within the passenger suite seating unit 200 may be configured to interact with a user interface (e.g., buttons, touch screen) in order to selectively actuate the actuation/roller assemblies 224, 228, 232 via electrical signals. By way of another example, the actuation/roller assemblies 224, 228, 232 may be selectively actuatable by mechanical means (e.g., pull-cord, draw string, and the like).

In some embodiments, the curtains 222, 226, 230 may include one or more components configured to retain the curtains 222, 226, 230 in a particular position. These components may include weighted structures, magnets, snaps, buttons, and the like. For example, as shown in FIG. 4, the curtains 222, 226 may include magnets 233a, 233b (e.g., switchable magnets). The magnets 234a, 234b may be configured to interact with magnets disposed within the desk 218 in order to keep the curtains 222, 226 taught when the curtains are in the deployed position. In this regard, the magnets 233a, 233b may be configured to provide some sense of rigidity to the flexible curtains 222, 226.

It is noted herein that a partition wall 210 including blinds or curtains (e.g., curtains 222, 226, 230) may further reduce the overall weight of the privacy bridge assembly 201 and passenger suite seating unit 200. It is further noted herein that a partition wall 210 including blinds or curtains 222, 226, 230 is not limited to the structure shown and described in FIG. 4. For example, in some embodiments, the curtains 222, 226, 230 may be coupled to the bridge assembly 201 via a track disposed within the lower surface of the bridge assembly. In this example, the one or more curtains 222, 226, 230 may be configured to be selectively actuated along a lateral/horizontal movement axis substantially parallel to the bridge structure 203 and/or desk 218. For instance, as shown in FIG. 2B-2C with respect to privacy panels 212, the one or more curtains 222, 226, 230 may be configured to be selectively actuated along a lateral/horizontal movement axis along the lower surface of the bridge structure 203. In this regard, the one or more curtains 222, 226, 230 may be selectively actuated from a stowed position proximate to the privacy shell elements 206a, 206b to a deployed position in which the curtains 222, 226, 230 extend across the passenger suite seating unit 200.

Figure 5:
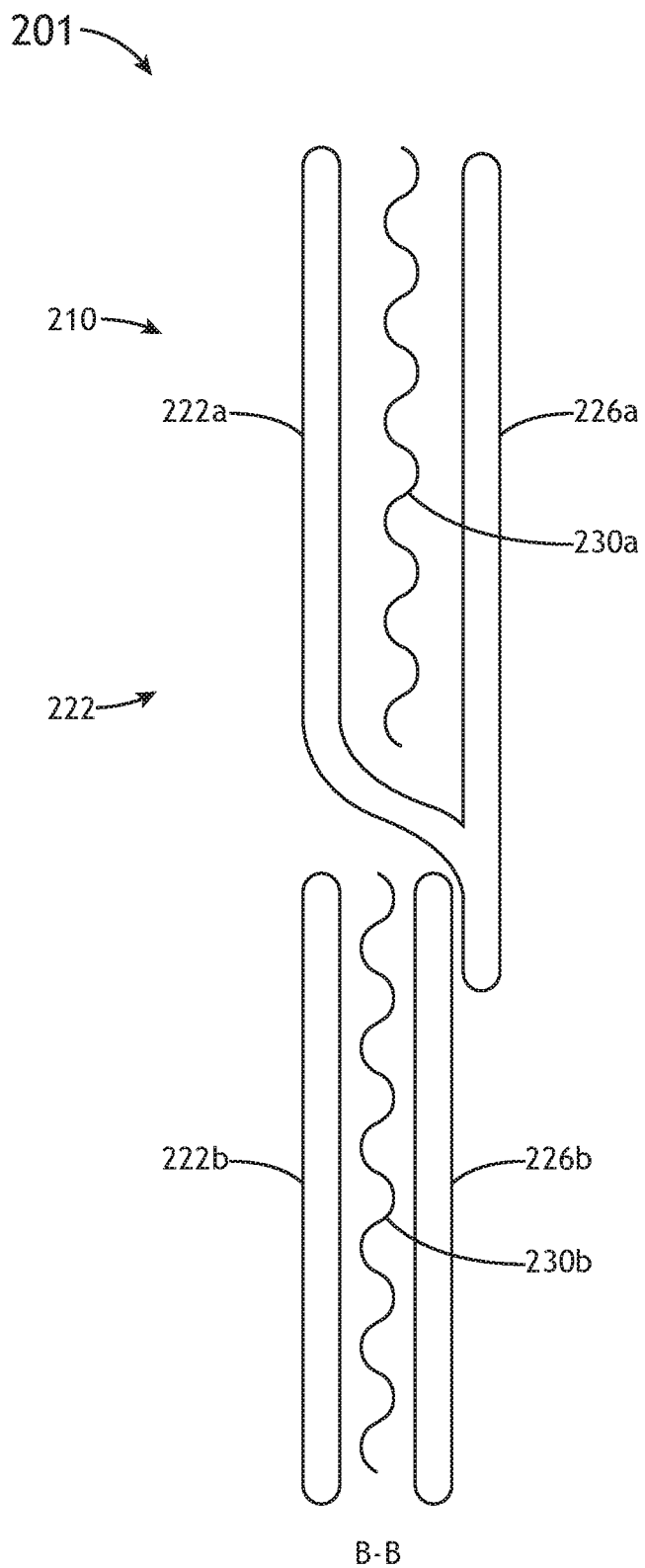
FIG. 5 illustrates a cross-sectional view of a partition wall of a privacy partition assembly, in accordance with one or more embodiments of the present disclosure. disclosure.

FIG. 5 illustrates a cross-sectional view of a partition wall 210 of a privacy partition assembly 201, in accordance with one or more embodiments of the present disclosure. disclosure. In particular, FIG. 5 illustrates a cross-sectional view of the privacy partition assembly 201 illustrated in FIG. 3 viewed along axis B-B.

In embodiments, the one or more curtains 222, 230, 226 may be divided up into multiple curtain segments. For example, the curtain 222 facing the first set of one or more passenger suites 202a, 202b may be divided up into curtain segments 222a and 222b, wherein the curtain segment 222a faces the first passenger suite 202a and the curtain segment 222b faces the second passenger suite 202b. By way of another example, the curtain 226 facing the second set of one or more passenger suites 202c, 202d may be divided up into curtain segments 226a and 226b, wherein the curtain segment 226a faces the third passenger suite 202c and the curtain segment 226b faces the fourth passenger suite 202d. Additionally, curtain 230 may be divided up into curtain segments 230a, 230b.

It is noted herein that dividing the one or more curtains 222, 226, 230 into two or more curtain segments may allow passengers to more finely customize the level of privacy and/or openness within the passenger suite seating unit. For example, by dividing the one or more curtains 222, 226, 230 into two or more curtain segments, each passenger within each of the passenger suites 202a-202d may be able to selectively actuate their own curtain segments independently from the others. In some embodiments with multiple curtain segments, one or more curtain segments may overlay so as to provide increased separation between the first set of one or more passenger suites 202a, 202b and the second set of one or more passenger suites 202c, 202d. For example, as shown in FIG. 5, the curtain segment 222a may overlap with the curtain segment 226b such that there is no un-obstructed line of sight from one side of the partition wall 210 to the other.

It is further noted herein that the configuration of the one or more curtains 222, 226, 230 shown and described in FIG. 5 may be applied when the curtains are to be selectively actuated along a vertical movement axis (e.g., substantially perpendicular to the desk 218 and/or bridge structure 203) and/or when the curtains are to be selectively actuated along a horizontal movement axis (e.g., substantially parallel and/or along the desk 218 and/or bridge structure 203).

It is further noted herein that the partition wall 210 (e.g., curtains 222, 226, 230, privacy panels 212) may be actuated in any manner known in the art. In this regard, actuation of the partition wall 210 may not be limited to actuation along a horizontal and/or vertical movement axis, as described previously herein. Accordingly, the partition wall 210 may be actuated in any manner known in the art in order to provide for varying degrees of privacy and/or openness. For example, the partition wall 210 (e.g., curtains 222, 226, 230, privacy panels 212) may be actuated by rolling, may be actuated along a diagonal movement axis, may be actuated similar to theatre curtains, and the like.

Figure 6A:
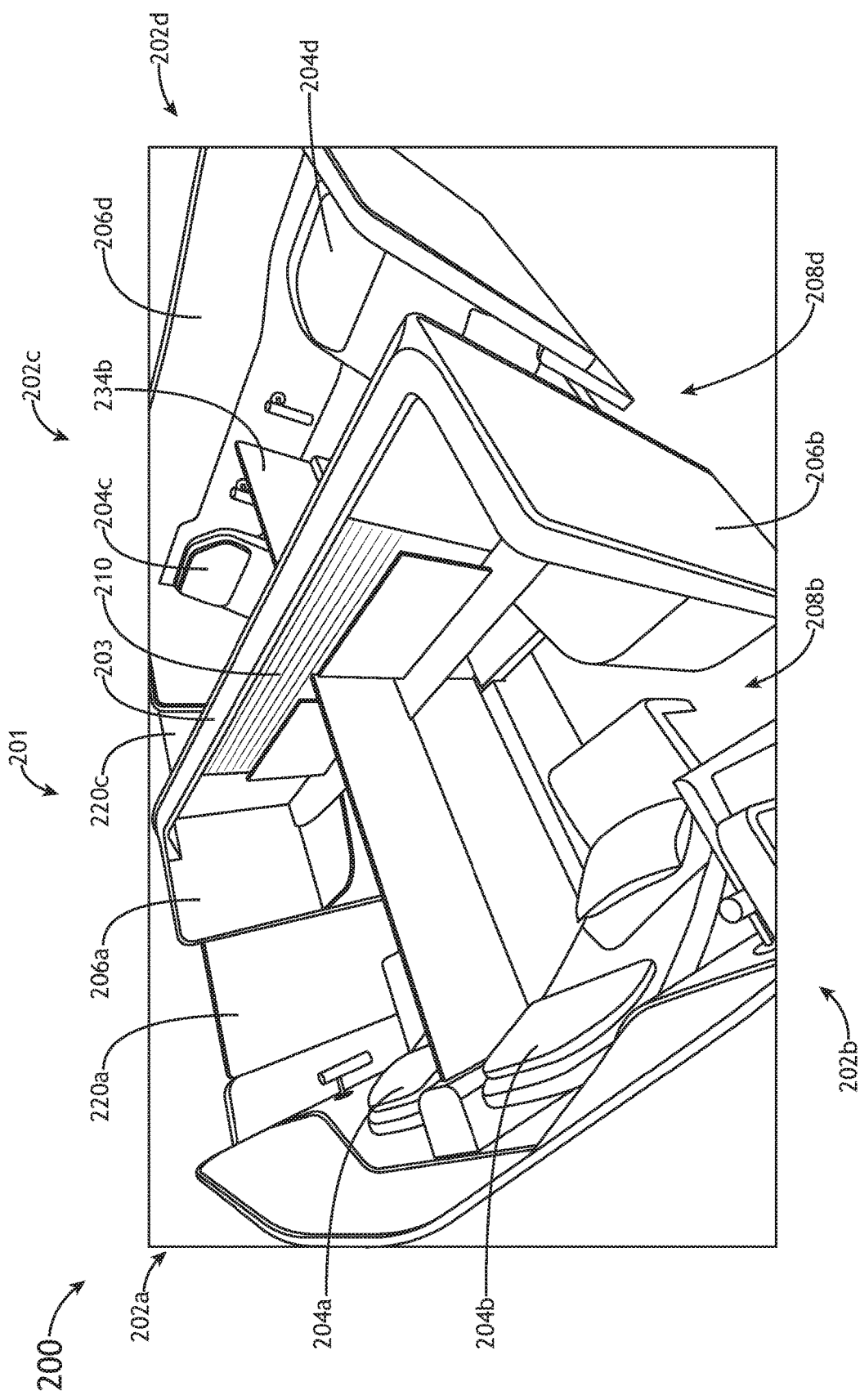
FIG. 6A illustrates a perspective view of a passenger suite seating unit including a bridge structure and a suite divider in an upright position, in accordance with one or more embodiments of the present disclosure.
Figure 6B:
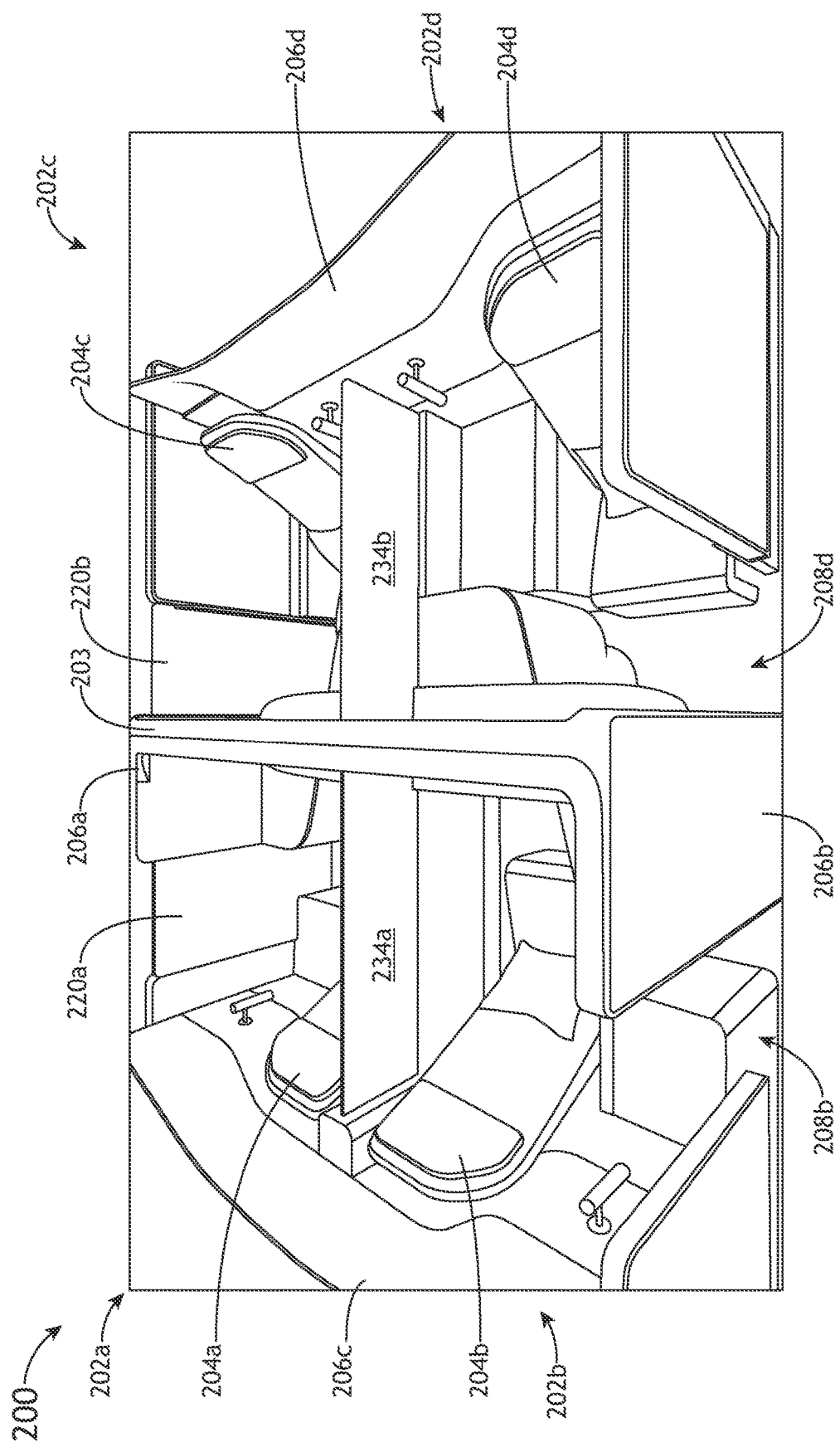
FIG. 6B illustrates a perspective view of a passenger suite seating unit including a bridge structure and a suite divider in an upright position, in accordance with one or more embodiments of the present disclosure.

FIGS. 6A-6B illustrate perspective views of a passenger suite seating unit 200 including a bridge structure 203 and a suite divider 234a, 234b in an upright position, in accordance with one or more embodiments of the present disclosure.

In some embodiments, the passenger suite seating unit 200 may further include one or more suite dividers 234a, 234b. In contrast to the privacy bridge assembly 201 which is configured to provide privacy between the first set of one or more passenger suites 202a, 202b and the second set of one or more passenger suites 202c, 202d, the one or more suite dividers 234a, 234b may be configured to provide privacy between the passenger suites 202 within each of the first set of one or more passenger suites 202a, 202b and the second set of one or more passenger suites 202c, 202d. In this regard, the one or more suite dividers 234a, 234b may be configured to provide privacy between the first passenger suite 202a and the second passenger suite 202b, and between the third passenger suite 202c and the fourth passenger suite 202d.

In embodiments, the one or more suite dividers 234a, 234b may extend from the privacy shell elements 206c, 206d to the privacy bridge assembly 201. For example, as shown in FIGS. 6A-6B, the suite divider 234a may be configured to extend from the privacy shell element 206c toward and/or to a first side of the privacy bridge assembly 201, and the suite divider 234b may be configured to extend from the privacy shell element 206d toward and/or to a second side of the privacy bridge assembly 201 opposite the first side. It is noted herein that the one or more suite dividers 234a, 234b may be arranged in any configuration within the passenger suite seating unit 200. For example, as shown in FIGS. 6A-6B, the one or more suite dividers 234a, 234b may be arranged orthogonally, or substantially orthogonally, to the privacy shell elements 206c, 206d and/or the privacy bridge assembly 201/partition wall 210. By way of another example, in additional and/or alternative embodiments, one or more of the suite dividers 234a, 234b may be arranged at a non-orthogonal angle with respect to the partition wall 210 and/or privacy shell elements 206c, 206d.

In some embodiments, the one or more suite dividers 234a, 234b may be configured to be selectively actuated in order to increase/decrease separation between the passenger suites 202a-202d of the passenger suite seating unit 200. For example, FIGS. 6A-6B may illustrate the one or more suite dividers 234a, 234b in a "deployed" or "extended" position, wherein the one or more suite dividers 234a, 234b at lease partially separate the passenger suites 202a-202d. In this example, the one or more suite dividers 234a, 234b may be selectively actuated from the deployed/extended position illustrated in FIGS. 6A-6B to the stowed/retracted position illustrated in FIGS. 7A-7B.

Figure 7A:
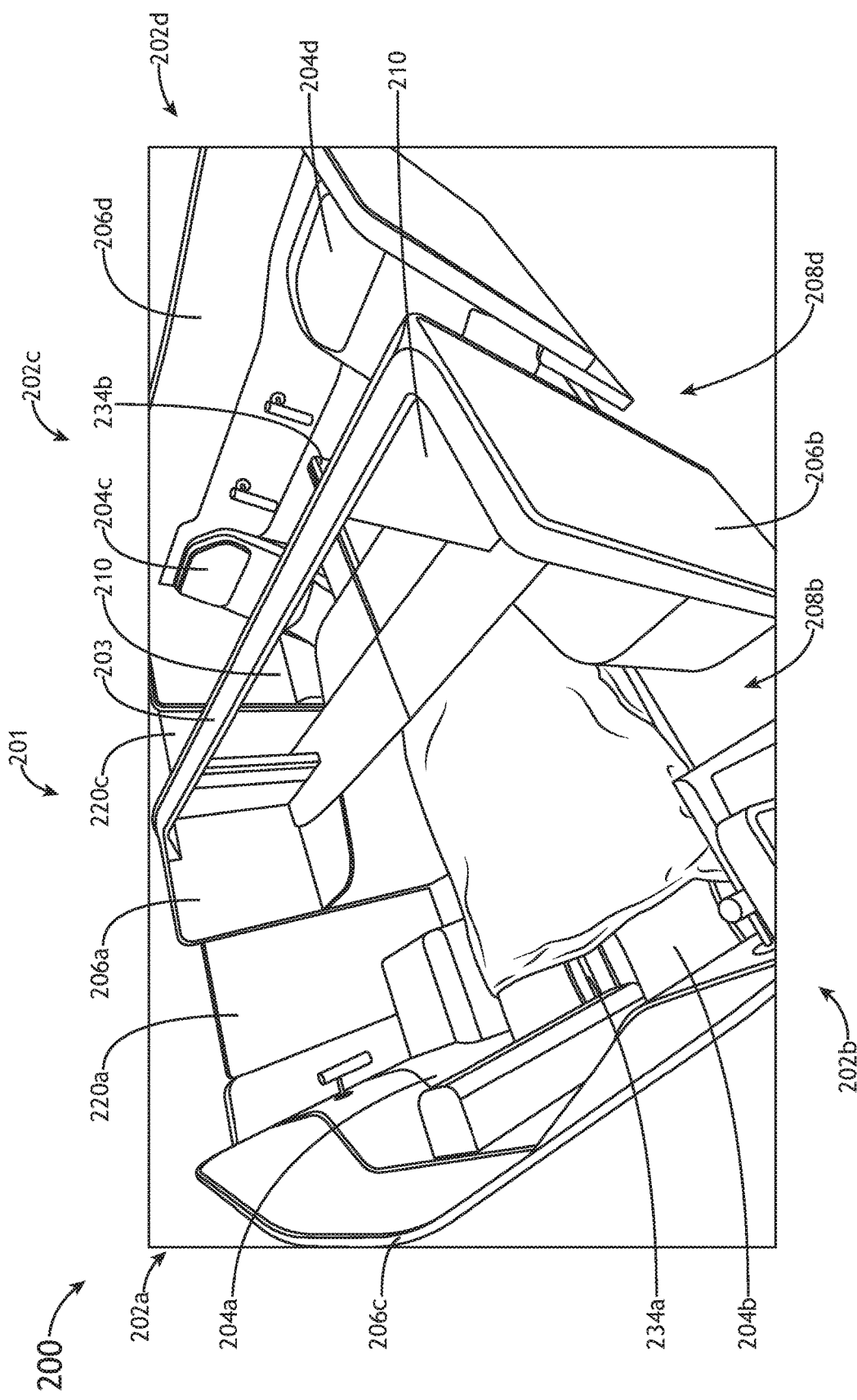
FIG. 7A illustrates a perspective view of a passenger suite seating unit including a bridge structure and a suite divider in a stowed position, in accordance with one or more embodiments of the present disclosure.
Figure 7B:
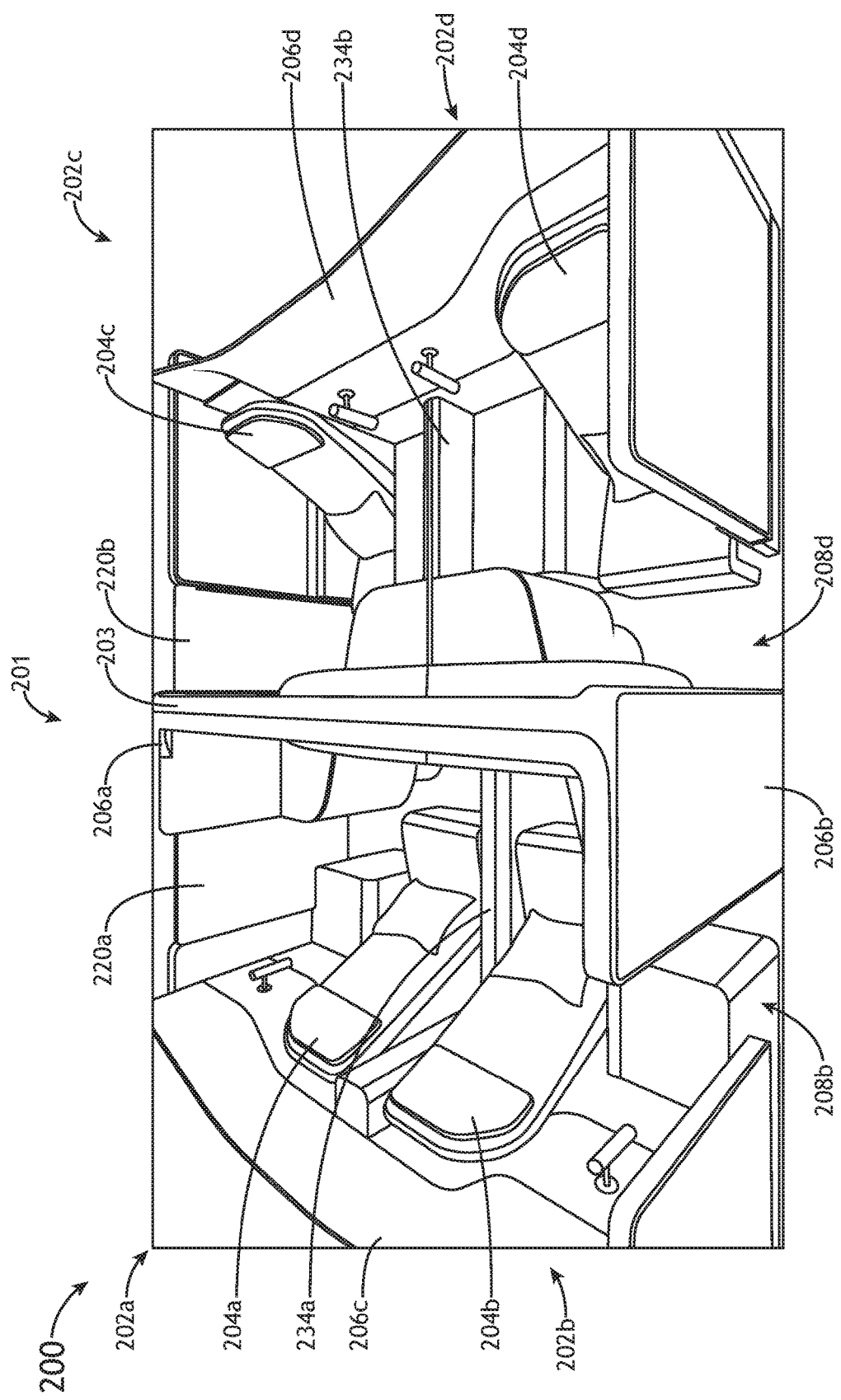
FIG. 7B illustrates a perspective view of a passenger suite seating unit including a bridge structure and a suite divider in a stowed position, in accordance with one or more embodiments of the present disclosure.

FIGS. 7A-7B illustrate perspective views of a passenger suite seating unit 200 including a bridge structure 203 and suite divider 234a, 234b in a stowed position, in accordance with one or more embodiments of the present disclosure.

As shown in FIGS. 7A-7B, the one or more suite dividers 234a, 234b may be selectively actuated from the deployed/extended position illustrated in FIGS. 6A-6B to the stowed/retracted position illustrated in FIGS. 7A-7B. It is contemplated herein that the one or more suite dividers 234a, 234b may be configured to be selectively actuated individually and/or in tandem. Retracting the one or more suite dividers 234a, 234b to the stowed position may allow for more openness within the first set of passenger suites 202a, 202b and the second set of passenger suites 202c, 202d. In some embodiments, retracting the one or more suite dividers 234a, 234b may allow adjacent passenger seats 204a-204d to be reclined into a bed structure. For example, as shown in FIG. 7A, the suite divider 234a may be actuated into a retracted position such that the first passenger seat 204a and the second passenger seat 204b may be reclined and formed into a single bed structure.

Although example embodiments of the present disclosure are shown and described in an aircraft environment, the inventive concepts of the present disclosure may be configured to operate in alternative and/or additional contexts, unless noted otherwise herein. In this regard, the passenger suite seating unit 200 may instead may be installed and/or configured or dimensioned to fit within any type of building or vehicle known in the art that has "pods" or "units" of seats or suites. For example, the passenger suite seating unit 200 may be implemented into the seats of any air, land, or water-based personal equipment or vehicle; any air, land, or water-based commercial equipment or vehicle (e.g., busses, trains, subways); any air, land, or water-based military equipment or vehicle known in the art. Additionally, it is noted herein the passenger suite seating unit 200 of the present disclosure may be installed and/or configured or dimensioned to fit on any seat within a home or a business. For example, the passenger suite seating unit 200 may be installed and/or configured or dimensioned to fit on a seat in auditoriums, movie theatres, sports venues (e.g., baseball parks, arenas, or other venues having installed seats, or the like), or other venues which include pods/units of seats or suites. Therefore, the above description should not be interpreted as a limitation on the disclosure but merely an illustration.

It is further noted herein that, where the environment includes an aircraft environment, it is noted herein the embodiments of passenger suite seating unit 200 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A passenger suite seating unit, comprising:
   a first set of one or more passenger suites and a second set of one or more passenger suites;
   a first privacy shell element defining at least a portion of a first side of the passenger suite seating unit, and a second privacy shell element defining at least a portion of a second side of the passenger suite seating unit; and
   a privacy bridge assembly comprising:
      a bridge structure extending from the first privacy shell element to the second privacy shell element; and
      a partition wall coupled to the bridge structure, the partition wall configured to at least partially separate the first set of one or more passenger suites and the second set of one or more passenger seats,
      wherein one or more privacy structures comprise one or more privacy panels configured to be actuated along a track disposed within the bridge structure,
      wherein one or more display devices are disposed on the one or more privacy panels,
      wherein a front surface of the one or more display devices is substantially flush with a front surface of the one or more privacy panels.

2. The passenger suite seating unit of claim 1, wherein the bridge structure is configured to structurally support the first privacy shell element and the second privacy shell element.

3. The passenger suite seating unit of claim 1, wherein the bridge structure extends from an upper surface of the first privacy shell element to an upper surface of the second privacy shell element.

4. The passenger suite seating unit of claim 1, wherein the partition wall comprises the one or more privacy structures coupled to a lower surface of the bridge structure.

5. The passenger suite seating unit of claim 1, wherein the passenger suite seating unit is disposed within a cabin of an aircraft.

6. The passenger suite seating unit of claim 1, further comprising a first set of one or more openings disposed within the first privacy shell element, and a second set of one or more openings disposed within the second privacy shell element, wherein the first set of one or more openings and the second set of one or more openings are configured to provide ingress and egress to the first set of one or more passenger suites and the second set of one or more passenger suites.

7. The passenger suite seating unit of claim 6,
   wherein the first privacy shell element includes one or more actuatable doors configured to be selectively actuated to a closed position in order to at least partially close the first set of one or more openings, and
   wherein the second privacy shell element includes one or more actuatable doors configured to be selectively actuated to a closed position in order to at least partially close the second set of one or more openings.

8. The passenger suite seating unit of claim 7,
   wherein the first set of one or more actuatable doors are slidingly coupled to the first privacy shell element and configured to be slidingly actuated between an open position and the closed position, and wherein the second set of one or more actuatable doors are slidingly coupled to the second privacy shell element and configured to be slidingly actuated between an open position and the closed position.

9. The passenger suite seating unit of claim 1, wherein the first set of one or more passenger suites comprises a first passenger suite and a second passenger suite, and wherein the second set of one or more passenger suites comprises a third passenger suite and a fourth passenger suite.

10. The passenger suite seating unit of claim 9, wherein the first passenger suite includes a first forward-facing passenger seat, the second passenger suite includes a second forward-facing passenger seat, the third passenger suite includes a third rearward facing passenger seat, and the fourth passenger suite includes a fourth rearward facing passenger seat.

11. The passenger suite seating unit of claim 9, further comprising one or more suite dividers arranged substantially orthogonal with respect to the partition wall, wherein the one or more suite dividers are configured to at least partially separate the first passenger suite and the second passenger suite of the first set of one or more passenger suites, and at least partially separate the third passenger suite and the fourth passenger suite of the second set of one or more passenger suites.

12. A passenger suite seating unit, comprising:

a first privacy shell element defining at least a portion of a first side of the passenger suite seating unit, and a second privacy shell element defining at least a portion of a second side of the passenger suite seating unit;

a bridge structure extending from a top surface of the first privacy shell element to a top surface of the second privacy shell element, the bridge structure configured to structurally support the first privacy shell element and the second privacy shell element; and a partition wall comprising one or more privacy structures coupled to a lower surface of the bridge structure, the partition wall configured to at least partially separate a first set of one or more passenger suites and a second set of one or more passenger seats of the passenger suite seating unit wherein one or more privacy structures comprise one or more privacy panels configured to be actuated along a track disposed within the bridge structure, wherein one or more display devices are disposed on the one or more privacy panels, wherein a front surface of the one or more display devices is substantially flush with a front surface of the one or more privacy panels.

\* \* \* \* \*